(12) United States Patent
Noguchi et al.

(10) Patent No.: US 7,960,467 B2
(45) Date of Patent: Jun. 14, 2011

(54) CARBON FIBER COMPOSITE MATERIAL AND METHOD OF PRODUCING THE SAME

(75) Inventors: Toru Noguchi, Ueda (JP); Akira Magario, Ueda (JP); Kazuyuki Yokoyama, Ueda (JP)

(73) Assignee: Nissin Kogyo Co., Ltd., Ueda-shi (JP)

( * ) Notice: Subject to any disclaimer, the term of this patent is extended or adjusted under 35 U.S.C. 154(b) by 329 days.

(21) Appl. No.: 11/987,253

(22) Filed: Nov. 28, 2007

(65) Prior Publication Data

US 2008/0132635 A1    Jun. 5, 2008

(30) Foreign Application Priority Data

Nov. 30, 2006 (JP) .................................. 2006-323698
Sep. 21, 2007 (JP) .................................. 2007-245481

(51) Int. Cl.
*C08K 7/02*      (2006.01)
(52) U.S. Cl. .................... 524/495; 264/331.13
(58) Field of Classification Search .................. 524/495; 264/331.13
See application file for complete search history.

(56) References Cited

U.S. PATENT DOCUMENTS

| 1,996,036 A * | 3/1935 | Tuley ......................... 525/333.1 |
| 6,453,960 B1 | 9/2002 | Kondo et al. |
| 2004/0241440 A1 | 12/2004 | Noguchi et al. |
| 2005/0075443 A1 | 4/2005 | Noguchi et al. |
| 2006/0016522 A1 | 1/2006 | Noguchi et al. |
| 2006/0062986 A1 | 3/2006 | Magario et al. |
| 2006/0079627 A1 | 4/2006 | Noguchi et al. |
| 2006/0214560 A1 | 9/2006 | Noguchi et al. |
| 2007/0100058 A1 | 5/2007 | Noguchi et al. |
| 2007/0112124 A1 | 5/2007 | Noguchi et al. |

FOREIGN PATENT DOCUMENTS

| EP | 1 466 940 A1 | 10/2004 |
| EP | 1 500 677 A2 | 1/2005 |
| EP | 1 702 953 A2 | 9/2006 |
| EP | 1 840 156 A1 | 10/2007 |
| JP | A-2000-309655 | 11/2000 |
| JP | A-2005-062474 | 3/2005 |
| JP | A-2005-097525 | 4/2005 |
| JP | A-2005-097534 | 4/2005 |
| JP | A-2005-336512 | 12/2005 |
| JP | A-2006-028411 | 2/2006 |
| WO | WO 2006/059574 A1 | 6/2006 |

OTHER PUBLICATIONS

U.S. Appl. No. 11/475,032, filed Jun. 27, 2006 by Noguchi et al.

(Continued)

*Primary Examiner* — Christina Johnson
*Assistant Examiner* — Xue Liu
(74) *Attorney, Agent, or Firm* — Oliff & Berridge, PLC

(57) ABSTRACT

A method of producing a carbon fiber composite material including: (a) masticating an elastomer to reduce the molecular weight of the elastomer to obtain a liquid elastomer; (b) mixing the elastomer obtained in the step (a) and carbon nanofibers having an average diameter of 0.5 to 500 nm to obtain a mixture; (c) increasing the molecular weight of the elastomer in the mixture obtained in the step (b) to obtain a rubbery elastic mixture; and (d) mixing the rubbery elastic mixture obtained in the step (c) to disperse the carbon nanofibers in the elastomer by a shear force to obtain a carbon fiber composite material.

10 Claims, 4 Drawing Sheets

OTHER PUBLICATIONS

U.S. Appl. No. 11/475,033, filed Jun. 27, 2006 by Noguchi et al.
U.S. Appl. No. 11/594,933, filed Nov. 9, 2006 by Noguchi et al.
U.S. Appl. No. 11/785,875, filed Apr. 20, 2007 by Noguchi et al.
U.S. Appl. No. 11/785,881, filed Apr. 20, 2007 by Noguchi et al.
New U.S. Patent Application filed on Nov. 28, 2007 by Noguchi et al.

* cited by examiner

F I G. 1
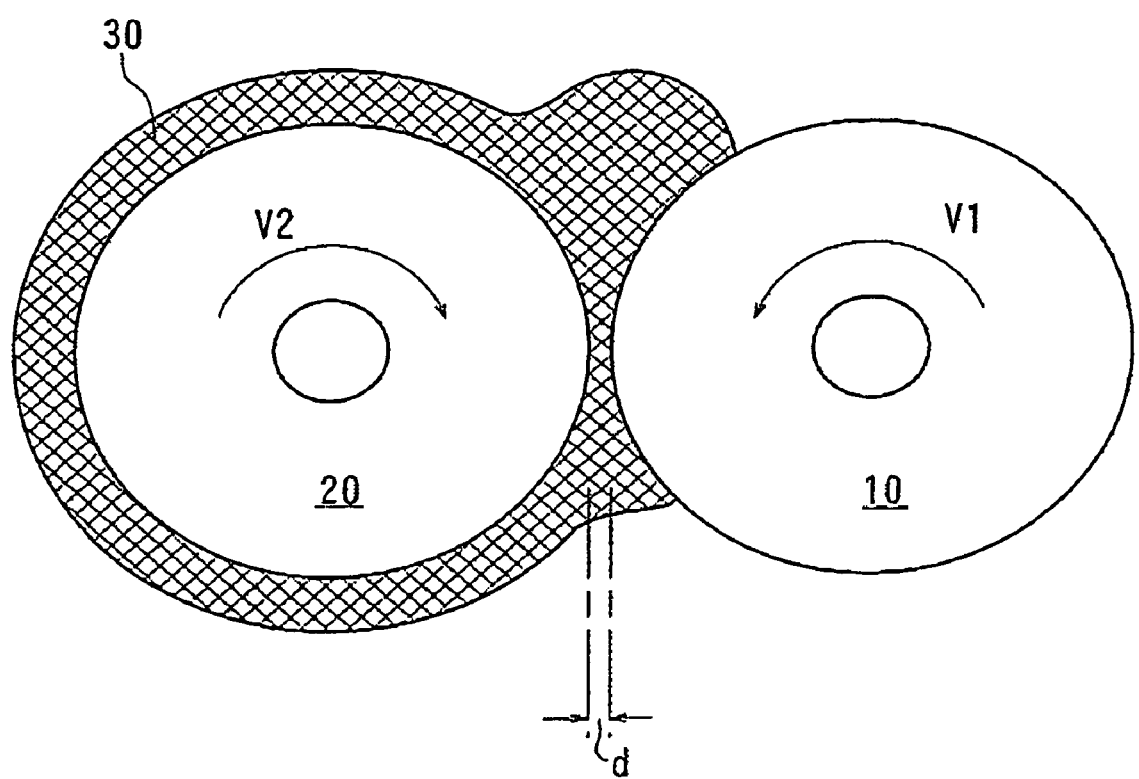

F I G. 2
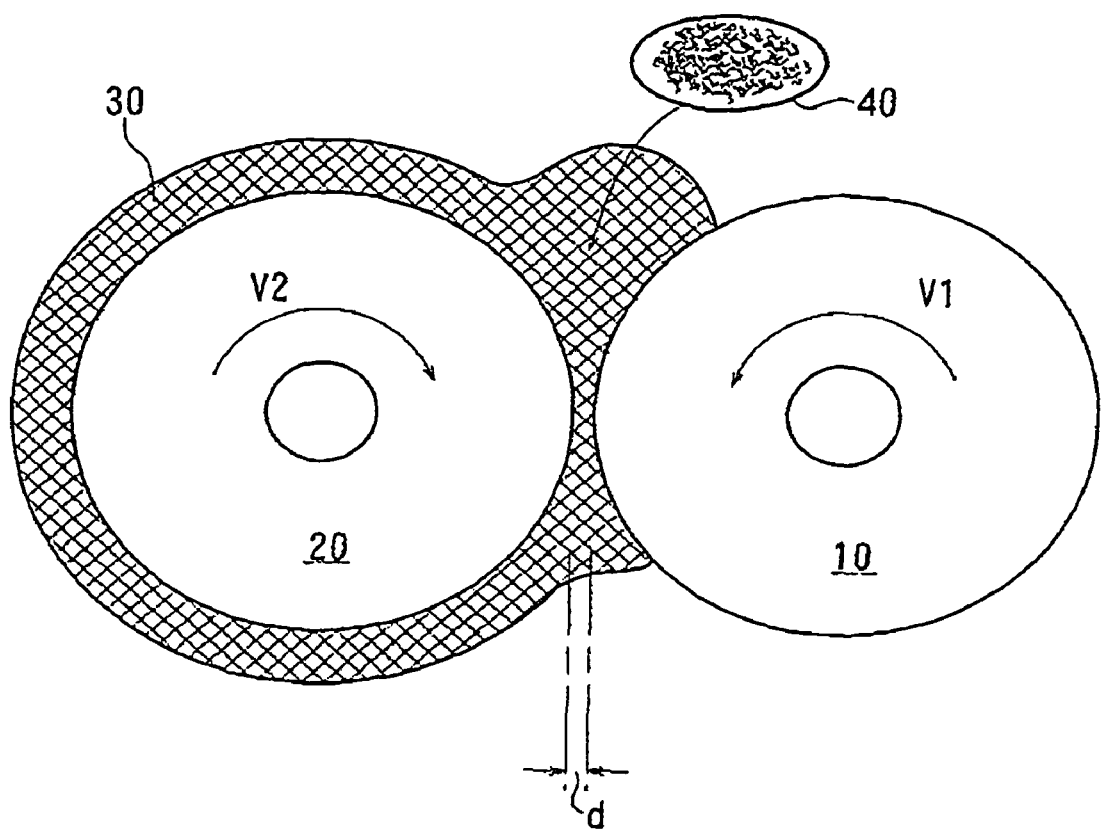

CARBON FIBER COMPOSITE MATERIAL AND METHOD OF PRODUCING THE SAME

Japanese Patent Application No. 2006-323698, filed on Nov. 30, 2006, and Japanese Patent Application No. 2007-245481, filed on Sep. 21, 2007, are hereby incorporated by reference in their entirety.

BACKGROUND OF THE INVENTION

The present invention relates to a carbon fiber composite material in which carbon nanofibers are uniformly dispersed, and a method of producing the same.

In general, it is difficult to disperse carbon nanofibers in a matrix as a filler. The inventors of the invention have proposed a method of producing a carbon fiber composite material which improves the dispersibility of carbon nanofibers to enable the carbon nanofibers to be uniformly dispersed in an elastomer (see JP-A-2005-97525, for example). According to this method, an elastomer and carbon nanofibers are mixed to improve the dispersibility of the carbon nanofibers with strong aggregating properties due to a shear force. More specifically, when mixing an elastomer and carbon nanofibers, the viscous elastomer enters the space between the carbon nanofibers, whereby a specific portion of the elastomer bonds to a highly active site of the carbon nanofibers through chemical interaction. When a high shear force is applied to the mixture of the elastomer having an appropriately long molecular length and a high molecular mobility (exhibiting elasticity) and the carbon nanofibers, the carbon nanofibers move along with the deformation of the elastomer. The aggregated carbon nanofibers are separated by the restoring force of the shorn elastomer due to elasticity, and become dispersed in the elastomer.

The inventors have also proposed a method of producing a carbon fiber-metal composite material in which carbon nanofibers are uniformly dispersed in a matrix such as a metal matrix using a carbon fiber composite material in which carbon nanofibers are uniformly dispersed (see JP-A-2005-97534, for example).

As described above, expensive carbon nanofibers can be efficiently used as a filler for a composite material by improving the dispersibility of the carbon nanofibers in the matrix.

SUMMARY

According to a first aspect of the invention, there is provided a method of producing a carbon fiber composite material comprising:

(a) masticating an elastomer, the elastomer in uncrosslinked form having a first spin-spin relaxation time ($T2n$), measured at 30° C. by a Hahn-echo method using a pulsed NMR technique with $^1H$ as an observing nucleus, of 100 to 3000 microseconds, to reduce the molecular weight of the elastomer to obtain a liquid elastomer;

(b) mixing the elastomer obtained in the step (a) and carbon nanofibers having an average diameter of 0.5 to 500 nm to obtain a mixture;

(c) increasing the molecular weight of the elastomer in the mixture obtained in the step (b) to obtain a rubbery elastic mixture; and (d) mixing the rubbery elastic mixture obtained in the step (c) to disperse the carbon nanofibers in the elastomer by a shear force to obtain a carbon fiber composite material.

According to a second aspect of the invention, there is provided a carbon fiber composite material obtained by the above-described producing method.

BRIEF DESCRIPTION OF THE SEVERAL VIEWS OF THE DRAWING

FIG. 1 is a diagram schematically showing a step (a).
FIG. 2 is a diagram schematically showing a step (b).

DETAILED DESCRIPTION OF THE EMBODIMENT

Figure 3:
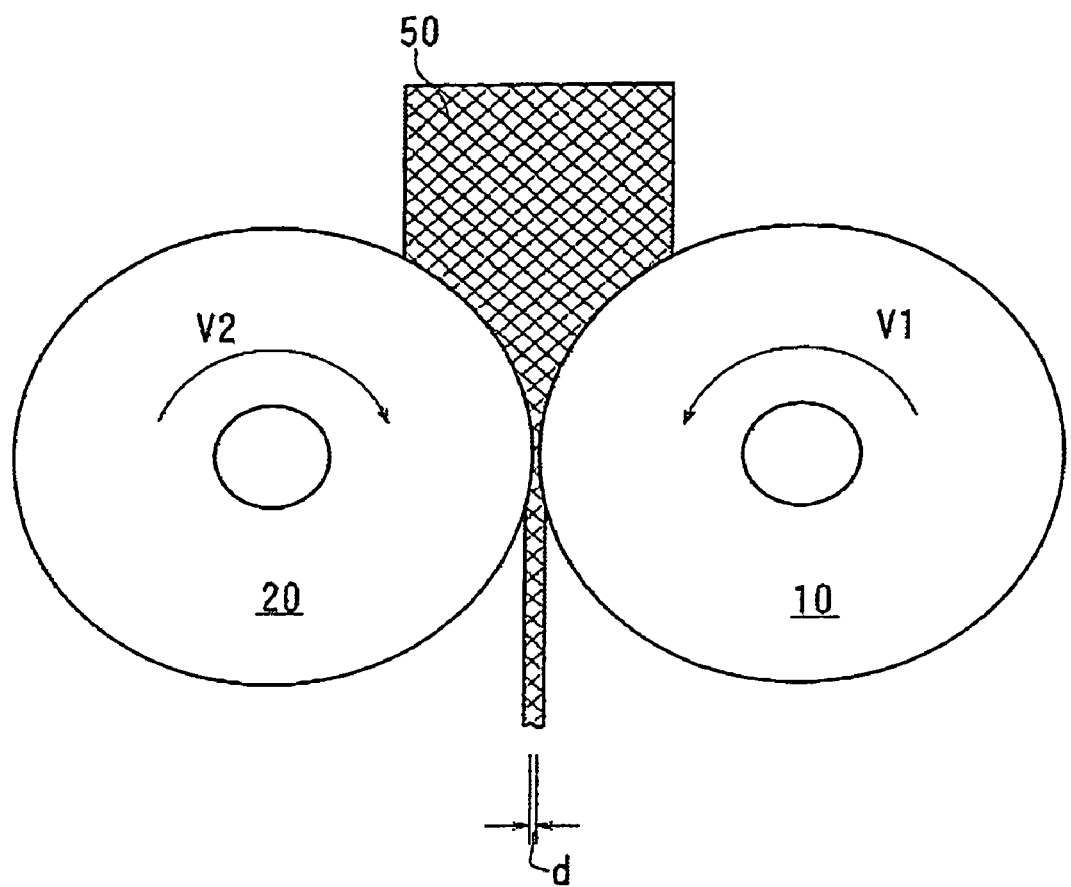
FIG. 3 is a diagram schematically showing a step (d).

The invention may provide a carbon fiber composite material in which carbon nanofibers are uniformly dispersed, and a method of producing the same.

According to one embodiment of the invention, there is provided a method of producing a carbon fiber composite material comprising:

(a) masticating an elastomer, the elastomer in uncrosslinked form having a first spin-spin relaxation time ($T2n$), measured at 30° C. by a Hahn-echo method using a pulsed NMR technique with $^1H$ as an observing nucleus, of 100 to 3000 microseconds, to reduce the molecular weight of the elastomer to obtain a liquid elastomer;

(b) mixing the elastomer obtained in the step (a) and carbon nanofibers having an average diameter of 0.5 to 500 nm to obtain a mixture;

(c) increasing the molecular weight of the elastomer in the mixture obtained in the step (b) to obtain a rubbery elastic mixture; and (d) mixing the rubbery elastic mixture obtained in the step (c) to disperse the carbon nanofibers in the elastomer by a shear force to obtain a carbon fiber composite material.

According to the method of producing a carbon fiber composite material according to this embodiment, a carbon fiber composite material in which carbon nanofibers are dispersed in an elastomer with improved uniformity can be obtained by reducing the viscosity of the elastomer in the step (a) before mixing the elastomer and the carbon nanofibers. More specifically, the liquid elastomer of which the molecular weight has been reduced by the step (a) easily enters the space between the aggregated carbon nanofibers in the step (b) as compared with a method in which carbon nanofibers are mixed with an elastomer having a high molecular weight, whereby the carbon nanofibers can be dispersed more uniformly in the step (c). Since a large number of free radicals of the elastomer produced by cutting the molecules of the elastomer in the step (a) can bond strongly to the surface of the carbon nanofibers in the step (b), the carbon nanofibers can be dispersed with improved uniformity in the step (c).

In this method of producing a carbon fiber composite material,
the liquid elastomer obtained in the step (a) in uncrosslinked form may have a first spin-spin relaxation time ($T2n$), measured at 30° C. by the Hahn-echo method using the pulsed NMR technique with $^1H$ as an observing nucleus, of greater than 3000 microseconds; and
the rubbery elastic mixture obtained in the step (c) may have a first spin-spin relaxation time ($T2n$), measured at 30° C. by the Hahn-echo method using the pulsed NMR technique with $^1H$ as an observing nucleus, of 3000 microseconds or less.

In this method of producing a carbon fiber composite material, the first spin-spin relaxation time ($T2n$) of the liquid elastomer obtained in the step (a) may be 5 to 30 times the first spin-spin relaxation time (T2n) of the elastomer before mastication in the step (a).

In this method of producing a carbon fiber composite material, the first spin-spin relaxation time (T2n) of the rubbery elastic mixture obtained in the step (c) may be 0.5 to 10 times the first spin-spin relaxation time (T2n) of the elastomer before mastication in the step (a).

In this method of producing a carbon fiber composite material, the first spin-spin relaxation time (T2n) of the carbon fiber composite material obtained in the step (d) may be shorter than the first spin-spin relaxation time (T2n) of the rubbery elastic mixture obtained in the step (c).

In this method of producing a carbon fiber composite material, the carbon fiber composite material in uncrosslinked form may have a first spin-spin relaxation time (T2n), measured at 150° C. by the Hahn-echo method using the pulsed NMR technique with $^1$H as an observing nucleus, of 100 to 3000 microseconds, and a fraction (fnn) of components having a second spin-spin relaxation time (T2nn) of less than 0.2.

The method of producing a carbon fiber composite material may further comprise: (e) crosslinking the carbon fiber composite material obtained in the step (d).

In this method of producing a carbon fiber composite material, the molecular weight of the elastomer may be increased in the step (c) by heating the mixture obtained in the step (b).

In this method of producing a carbon fiber composite material, the step (d) may be performed by an open-roll method with a roll distance of 0.5 mm or less.

In this method of producing a carbon fiber composite material, a roll temperature may be set at 0 to 50° C. in the step (d).

According to one embodiment of the invention, there is provided a carbon fiber composite material obtained by the above-described method of producing a carbon fiber composite material.

In the carbon fiber composite material according to this embodiment, the carbon nanofibers are uniformly dispersed in the elastomer. Since the carbon nanofibers are uniformly dispersed in the carbon fiber composite material according to this embodiment, a carbon fiber composite material with the desired rigidity can be obtained with a reduced amount of carbon nanofibers, for example. Thus, expensive carbon nanofibers can be used efficiently. A decrease in elongation at break (%) of the carbon fiber composite material according to this embodiment is small even if the amount of carbon nanofibers is increased.

The elastomer used in the step (a) according to this embodiment may be a rubber elastomer or a thermoplastic elastomer. When using a rubber elastomer, an uncrosslinked elastomer is preferable since the carbon nanofibers can be easily mixed.

The embodiments of the invention are described below in detail with reference to the drawings.

FIG. 1 is a diagram schematically showing a step (a) utilizing an open-roll method according to this embodiment. FIG. 2 is a diagram schematically showing a step (b). FIG. 3 is a diagram schematically showing a step (d).

A method of producing a carbon fiber composite material according to this embodiment includes (a) masticating an elastomer, the elastomer in uncrosslinked form having a first spin-spin relaxation time (T2n), measured at 30° C. by a Hahn-echo method using a pulsed NMR technique with $^1$H as an observing nucleus, of 100 to 3000 microseconds, to reduce the molecular weight of the elastomer to obtain a liquid elastomer, (b) mixing the elastomer obtained in the step (a) and carbon nanofibers having an average diameter of 0.5 to 500 nm to obtain a mixture, (c) increasing the molecular weight of the elastomer in the mixture obtained in the step (b) to obtain a rubbery elastic mixture, and (d) mixing the rubbery elastic mixture obtained in the step (c) to disperse the carbon nanofibers in the elastomer by a shear force to obtain a carbon fiber composite material.

Step (a)

The step (a) of the method of producing a carbon fiber composite material according to this embodiment is described below.

In the step (a), a raw material elastomer is masticated to reduce the molecular weight of the elastomer to obtain a liquid elastomer. Since the viscosity of the elastomer decreases when the molecular weight of the elastomer decreases as a result of mastication, the elastomer easily enters the space between the aggregated carbon nanofibers in the step (b). The network component of the raw material elastomer in uncrosslinked form has a first spin-spin relaxation time (T2n), measured at 30° C. by the Hahn-echo method using the pulsed NMR technique with $^1$H as an observing nucleus, of 100 to 3000 microseconds. The raw material elastomer is masticated to reduce the molecular weight of the elastomer to obtain an elastomer having a first spin-spin relaxation time (T2n) of more than 3000 microseconds. The first spin-spin relaxation time (T2n) of the elastomer obtained in the step (a) is preferably 5 to 30 times the first spin-spin relaxation time (T2n) of the raw material elastomer before being masticated in the step (a).

Mastication in the step (a) is performed until the elastomer is liquefied (i.e., until the elastomer exhibits fluidity which is not suitable for mixing) by cutting the molecules of the elastomer by applying a high shear force using an open-roll method or the like to reduce the molecular weight of the elastomer, differing from normal mastication performed in a state in which the elastomer in solid. When using an open-roll method, the step (a) is performed at a roll temperature of 20° C. (minimum mastication time: 60 minutes) to 150° C. (minimum mastication time: 10 minutes), for example. FIG. 1 is a diagram schematically showing the step (a) utilizing the open-roll method using two rolls. A first roll 10 and a second roll 20 are disposed at a predetermined distance d (e.g., 0.1 mm to 1.0 mm). The first roll 10 and the second roll 20 are respectively rotated at rotational speeds V1 and V2 in the directions indicated by arrows in FIG. 1 or in the reverse directions. An elastomer 30 is wound around the second roll 20 which is set at a predetermined temperature. The elastomer 30 is then liquefied by mastication in the step (a), and removed from the second roll 20. The step (a) is not limited to the open-roll method shown in FIG. 1. An internal mixing method or a multi-screw extrusion kneading method may also be used.

The spin-spin relaxation time (T2) obtained by the Hahn-echo method using the pulsed NMR technique is a measure which indicates the molecular mobility of a substance. In more detail, when measuring the spin-spin relaxation time of an elastomer by the Hahn-echo method using the pulsed NMR technique, a first component having a shorter first spin-spin relaxation time (T2n) and a second component having a longer second spin-spin relaxation time (T2nn) are detected. The first component corresponds to the network component (backbone molecule) of the polymer, and the second component corresponds to the non-network component (branched component such as terminal chain) of the polymer. The shorter the first spin-spin relaxation time (T2n), the lower the molecular mobility and the harder the elastomer. The longer the first spin-spin relaxation time (T2n), the higher the molecular mobility and the softer the elastomer. If the first spin-spin relaxation time (T2n) is longer than 3000 microseconds, the elastomer flows (liquid state), The elastomer in this state has no elasticity. A substance having a first spin-spin relaxation time (T2n) of longer than 3000 microseconds is in a liquid state. For example, the first spin-spin relaxation time (T2n) of water is 143 msec, the first spin-spin relaxation time (T2n) of paraffinic oil (PW180) is 15 msec, and the first spin-spin relaxation time (T2n) of a liquid rubber is 4000 to 10,000 microseconds at room temperature (30° C.).

As the measurement method for the pulsed NMR technique, a solid-echo method, a Carr-Purcell-Meiboom-Gill (CPMG) method, or a 90-degree pulse method may be applied instead of the Hahn-echo method. However, since the carbon fiber composite material according to the invention has a medium spin-spin relaxation time (T2), the Hahn-echo method is most suitable. In general, the solid-echo method and the 90-degree pulse method are suitable for measuring a short spin-spin relaxation time (T2), the Hahn-echo method is suitable for measuring a medium spin-spin relaxation time (T2), and the CPMG method is suitable for measuring a long spin-spin relaxation time (T2).

The raw material elastomer used in the step (a) has a molecular weight of preferably 5000 to 5000,000, and still more preferably 20,000 to 3000,000. If the molecular weight of the elastomer is greater than 5000,000, the elastomer becomes too hard, whereby processing in the step (a) becomes difficult. The elastomer obtained by the step (a) has a significantly reduced molecular weight of 100 to 20,000 due to mastication, for example.

At least one of the main chain, side chain, and terminal chain of the raw material elastomer preferably includes an unsaturated bond or a group having affinity to the carbon nanofiber (particularly to its terminal radical), or the elastomer preferably has properties of readily producing such a radical or group. The unsaturated bond or group is preferably at least one unsaturated bond or group selected from a double bond, a triple bond, and functional groups such as a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group, and a urea group.

A carbon nanofiber generally has a structure in which the side surface is formed of a six-membered ring of carbon atoms and the end is closed by a five-membered ring. Since the carbon nanofiber has a forced structure, a defect tends to occur, whereby a radical or a functional group tends to be formed at such a defect. In this embodiment, at least one of the main chain, side chain, and terminal chain of the elastomer preferably includes an unsaturated bond or a group having high affinity (reactivity or polarity) to the radical of the carbon nanofiber. Such an elastomer can be bonded to the carbon nanofiber. According to this embodiment, since a large number of molecules of the elastomer are cut in the step (a) as compared with normal mastication, a large number of free radicals are produced, whereby the free radicals of the elastomer are easily bonded to the carbon nanofibers.

As the elastomer, an elastomer such as natural rubber (NR), epoxidized natural rubber (ENR), styrene-butadiene rubber (SBR), nitrile rubber (NBR), chloroprene rubber (CR), ethylene propylene rubber (EPR or EPDM), butyl rubber (IIR), chlorobutyl rubber (CIIR), acrylic rubber (ACM), silicone rubber (Q), fluorine rubber (FKM), butadiene rubber (BR), epoxidized butadiene rubber (EBR), epichlorohydrin rubber (CO or CEO), urethane rubber (U), or polysulfide rubber (T); a thermoplastic elastomer such as an olefin-based elastomer (TPO), a polyvinyl chloride-based elastomer (TPVC), a polyester-based elastomer (TPEE), a polyurethane-based elastomer (TPU), a polyamide-based elastomer (TPEA), or a styrene-based elastomer (SBS); or a mixture of these elastomers may be used. In particular, a highly polar elastomer which readily produces free radicals when mixing the elastomer, such as natural rubber (NR) or nitrile rubber (NBR), is preferable.

Step (b)

The step (b) of the method of producing a carbon fiber composite material according to this embodiment is described below.

In the step (b), the elastomer obtained in the step (a) and carbon nanofibers having an average diameter of 0.5 to 500 nm are mixed to obtain a mixture. When using an open-roll method in the same manner as in the step (a), the step (b) may be carried out using two rolls used in the step (a), for example. FIG. 2 is a diagram schematically showing the step (b) utilizing the open-roll method using two rolls. The distance d between the rolls and the rotational speeds V1 and V2 of the rolls may be the same as those of the step (a). After supplying a predetermined amount of carbon nonofibers 40 to the elastomer 30 wound around the rotating second roll 20, the elastomer 30 and the carbon nanofibers 40 are mixed. The step (b) is not limited to the open-roll method shown in FIG. 2. An internal mixing method or a multi-screw extrusion kneading method may also be used. In the step (b), the elasticity of the liquid elastomer 30 has been significantly reduced. Therefore, the aggregated carbon nanofibers are dispersed to only a small extent, even if the carbon nanofibers and the carbon nanofibers are mixed in a state in which free radicals of the elastomer are bonded to the carbon nanofibers. Therefore, the mixture obtained in the step (b) has a first spin-spin relaxation time (T2n) almost equal to that of the elastomer obtained in the step (a).

The carbon nanofibers used in the step (b) preferably have an average diameter of 0.5 to 500 nm, and more preferably 0.5 to 100 nm. The carbon nanofibers preferably have an average length of 0.01 to 1000 micrometers. The amount of carbon nanofibers added is not particularly limited, but may be determined depending on the application.

As examples of the carbon nanofiber, a carbon nanotube and the like can be given. The carbon nanotube is classified as a single-layer carbon nanotube having one rolled layer of a single graphite sheet having a hexagonal carbon network (single-walled carbon nanotube (SWNT)), a two-layer carbon nanotube having two rolled layers (double-walled carbon nanotube (DWNT)), and a multi-layer carbon nanotube having three or more rolled layers (multi-walled carbon nanotube (MWNT)). The carbon nanotube used in the step (b) may be formed only of a single-layer structure or a multi-layer structure, or may have a single-layer structure and a multi-layer structure in combination. A vapor-grown carbon fiber (VGCF, trademark of Showa Denko K.K.) having particularly few defects may be used as a multi-layer carbon nanotube (multi-walled carbon nanotube (MWNT)). A carbon material having a partial carbon nanotube structure may also be used. A carbon nanotube may also be referred to as a graphite fibril nanotube. Carbon nanofibers graphatized at about 2300° C. to 3200° C. together with a graphatization catalyst such as boron, boron carbide, beryllium, aluminum, and silicon may also be used.

A single-layer carbon nanotube or a multi-layer carbon nanotube is produced to a desired size using an arc discharge method, a laser ablation method, a vapor-phase growth method, or the like.

In the arc discharge method, an arc is discharged between electrode materials made of carbon rods in an argon or hydrogen atmosphere at a pressure slightly lower than atmospheric pressure to obtain a multi-layer carbon nanotube deposited on the cathode. When a catalyst such as nickel/cobalt is mixed into the carbon rod and an arc is discharged, a single-layer carbon nanotube is obtained from soot adhering to the inner side surface of a processing vessel.

In the laser ablation method, a target carbon surface into which a catalyst such as nickel/cobalt is mixed is irradiated with strong pulse laser light from a YAG laser in a noble gas (e.g., argon) to melt and vaporize the carbon surface to obtain a single-layer carbon nanotube.

In the vapor-phase growth method, a carbon nanotube is synthesized by thermally decomposing hydrocarbons such as benzene or toluene in a vapor phase. As specific examples of the vapor-phase growth method, a floating catalyst method, a zeolite-supported catalyst method, and the like can be given.

The carbon nanofibers may be provided with improved adhesion to or wettability with the elastomer by subjecting the carbon nanofibers to a surface treatment such as an ion-injection treatment, a sputter-etching treatment, or a plasma treatment before mixing the carbon nanofibers with the elastomer in the step (b).

Step (c)

The step (c) of the method of producing a carbon fiber composite material according to this embodiment is described below.

In the step (c), the molecular weight of the elastomer in the mixture obtained in the step (b) is increased to obtain a rubbery elastic mixture. Since the mixture obtained in the step (c) is a rubbery elastic body, the network component of the mixture has a first spin-spin relaxation time (T2n), measured at 30° C. by the Hahn-echo method using the pulsed NMR technique with $^1H$ as an observing nucleus, of 3000 microseconds or less. The first spin-spin relaxation time (T2n) of the rubbery elastic mixture obtained in the step (c) is preferably 0.5 to 10 times the first spin-spin relaxation time (T2n) of the raw material elastomer before being masticated in the step (a). Since the rubbery elastic mixture is obtained in the step (c) by again extending the molecular chain cut in the step (a) to increase the molecular weight of the elastomer, the first spin-spin relaxation time (T2n) is reduced to 3000 microseconds or less. Specifically, the elasticity of the elastomer which has lost its elasticity is recovered, whereby a rubbery elastic mixture is obtained. The molecular weight of the elastomer in the rubbery elastic mixture obtained in the step (c) is preferably 5000 to 150,000. The elasticity of the rubbery elastic mixture may be expressed by the molecular form (which may be observed from molecular weight) or the molecular mobility (which may be observed from first spin-spin relaxation time (T2n)) of the elastomer.

In the step (c), the molecular weight of the elastomer may be increased by heating the mixture obtained in the step (b). The mixture is preferably heated by placing the mixture in a heating furnace set at a predetermined temperature (e.g., 40° C. to 100° C.) for 10 to 100 hours. This causes the molecular chain of the elastomer to extend due to bonding between free radicals existing in the mixture obtained in the step (b), whereby the molecular weight of the elastomer increases. The molecular weight of the elastomer may be increased in a short time by mixing a small amount (e.g., half an appropriate amount) of a crosslinking agent in the step (b), and heating (e.g., annealing) the mixture in the step (c) to effect a crosslinking reaction. When increasing the molecular weight of the elastomer by a crosslinking reaction, it is preferable to set the amount of crosslinking agent, the heating time, and the heating temperature so that mixing in the step (d) is not hindered.

Step (d)

The step (d) of the method of producing a carbon fiber composite material according to this embodiment is described below.

In the step (d), the rubbery elastic mixture obtained in the step (c) is mixed so that the carbon nanofibers are dispersed in the elastomer by a shear force to obtain a carbon fiber composite material. The rubbery elastic mixture obtained in the step (c) has a first spin-spin relaxation time (T2n/30° C.) of 3000 microseconds or less, and the elastomer contained therein has a molecular weight of 5000 to 150,000 (i.e., good elasticity). Therefore, the carbon nanofibers can be uniformly dispersed in the elastomer by applying a shear force to the mixture. The first spin-spin relaxation time (T2n) of the carbon fiber composite material obtained in the step (d) is reduced as compared with the first spin-spin relaxation time (T2n) of the rubbery elastic mixture obtained in the step (c) by uniformly dispersing the carbon nanofibers.

FIG. 3 is a diagram schematically showing the step (c) utilizing the open-roll method using two rolls. The first roll 10 and the second roll 20 are disposed at a predetermined distance d (e.g., 1.5 mm). A rubbery elastic mixture 50 obtained in the step (c) is wound around the second roll 20 in a state in which the first and second rolls 10 and 20 are rotated. The rubbery elastic mixture 50 is removed from the open rolls. After setting the distance d between the rolls at preferably 0.5 mm or less, and still more preferably 0.1 to 0.5 mm, the mixture is supplied to the open rolls and tight-milled several times. Tight milling is preferably performed about five to ten times, for example. When the surface velocity of the first roll 10 is indicated by V1 and the surface velocity of the second roll 20 is indicated by V2, the surface velocity ratio (V1/V2) of the first roll 10 to the second roll 20 during tight milling is preferably 1.05 to 3.00, and still more preferably 1.05 to 1.2. A desired shear force can be obtained using such a surface velocity ratio. The tight-milled carbon fiber composite material is sheeted by rolling using the rolls.

In the step (d), the mixture 50 is preferably mixed while setting the low roll temperature at 0 to 50° C., and more preferably at 5 to 30° C. in order to obtain a shear force as high as possible. The measured temperature of the mixture 50 is preferably adjusted to 0 to 50° C. This causes a high shear force to be applied to the mixture 50 so that the aggregated carbon nanofibers are separated in such a manner that the carbon nanofibers are removed by the elastomer molecules one by one and become dispersed in the elastomer. In particular, since the elastomer has entered the space between the carbon nanofiber aggregates and bonded to the carbon nanofibers by the step (a) and the step (b) and the molecular weight of the elastomer has been increased whereby the viscosity and the elasticity of the elastomer are recovered by the step (c), the mixture 50 has elasticity, viscosity, and chemical interaction with the carbon nanofibers. Therefore, the carbon nanofibers can be easily dispersed. As a result, a carbon fiber composite material in which carbon nanofibers have excellent dispersibility and dispersion stability (i.e., carbon nanofibers rarely reaggregate) can be obtained.

In more detail, when mixing the elastomer and the carbon nanofibers in the step (b), the liquid elastomer having a reduced viscosity enters the space between the carbon nanofibers, and a specific portion of the elastomer bonds to a highly active site of the carbon nanofiber through chemical interaction. In particular, the elastomer molecules easily enter the carbon nanofiber aggregates as compared with the case of mixing carbon nanofibers with a known rubbery elastic elastomer by mixing the liquid elastomer with the carbon nanofibers. However, since the elastomer cannot be provided with a force that disperses the aggregated carbon nanofibers, even if the mixture is mixed in this state, the carbon nanofibers cannot be dispersed uniformly in the elastomer. Therefore, the molecular length of the elastomer is appropriately increased by the step (c) to recover the molecular mobility (i.e., elasticity) of the elastomer. When a high shear force is applied to the rubbery elastic mixture in the step (d), the carbon nanofibers move along with the movement of the elastomer. The aggregated carbon nanofibers are separated by the restoring force of the shorn elastomer due to elasticity, and become dispersed in the elastomer. According to this embodiment, when the mixture is extruded through the narrow space between the rolls, the mixture is deformed to have a thickness greater than the roll distance as a result of the restoring force of the elastomer due to elasticity. It is estimated that the above deformation causes the mixture to which a high shear force is applied to flow in a more complicated manner to disperse the carbon nanofibers in the elastomer. The dispersed carbon nanofibers are prevented from reaggregating due to chemical interaction with the elastomer, whereby excellent dispersion stability can be obtained.

In the step of dispersing the carbon nanofibers in the elastomer by a shear force, an internal mixing method or a multi-screw extrusion kneading method may be used instead of the open-roll method. In other words, it suffices that a shear force sufficient to separate the aggregated carbon nanofibers be applied to the elastomer. It is particularly preferable to use the open-roll method in the step (d), since the actual temperature of the mixture can be measured and controlled while controlling the roll temperature.

The method of producing a carbon fiber composite material may further include (e) crosslinking the carbon fiber composite material obtained in the step (d). The carbon fiber composite material may be molded without crosslinking. The carbon fiber composite material may be used in the form of a sheet obtained using the open roll method. Or, the carbon fiber composite material obtained in the step (d) may be formed into a complicated shape using a rubber molding method such as injection molding, transfer molding, or press molding, or may be formed into a product having a continuous shape (e.g., sheet, angular cylinder, or round cylinder) using an extrusion method, a calendering method, or the like.

In the method of producing a carbon fiber composite material according to this embodiment, a compounding ingredient usually used when processing an elastomer such as rubber may be added. As the compounding ingredient, a known compounding ingredient may be used. As examples of the compounding ingredient, a crosslinking agent, a vulcanizing agent, a vulcanization accelerator, a vulcanization retarder, a softener, a plasticizer, a curing agent, a reinforcing agent, a filler, an aging preventive, a colorant, and the like can be given. The compounding ingredient may be added to the elastomer in the step (b), for example.

Carbon Fiber Composite Material

The carbon fiber composite material according to this embodiment is described below.

In the carbon fiber composite material obtained by the above method of producing a carbon fiber composite material, the carbon nanofibers are uniformly dispersed in the elastomer as the matrix. In other words, the elastomer is restrained by the carbon nanofibers. In this state, the mobility of the elastomer molecules restrained by the carbon nanofibers is lower than that of the elastomer molecules which are not restrained by the carbon nanofibers. Therefore, the first spin-spin relaxation time (T$2n$), the second spin-spin relaxation time (T$2nn$), and the spin-lattice relaxation time (T1) of the carbon fiber composite material according to this embodiment are shorter than those of the elastomer which does not include the carbon nanofibers. In particular, the first spin-spin relaxation time (T$2n$), the second spin-spin relaxation time (T$2nn$), and the spin-lattice relaxation time (T1) are further reduced by dispersing the carbon nanofibers. The spin-lattice relaxation time (T1) of the crosslinked form changes in proportion to the amount of carbon nanofibers mixed.

In a state in which the elastomer molecules are restrained by the carbon nanofibers, the number of non-network components (non-reticulate chain components) is considered to be reduced for the following reasons. Specifically, when the molecular mobility of the entire elastomer is decreased by the carbon nanofibers, since the number of non-network components which cannot easily move is increased, the non-network components tend to behave in the same manner as the network components. Moreover, since the non-network components (terminal chains) easily move, the non-network components tend to be adsorbed on the active sites of the carbon nanofibers. It is considered that these phenomena decrease the number of non-network components. Therefore, the fraction (fnn) of components having the second spin-spin relaxation time (T$2nn$) becomes smaller than that of the elastomer which does not include the carbon nanofibers. The fraction (fn) of components having the first spin-spin relaxation time (T$2n$) is greater than that of the elastomer which does not contain the carbon nanofibers, since fn+fnn=1.

Therefore, the carbon fiber composite material according to this embodiment preferably has values measured by the Hahn-echo method using the pulsed NMR technique within the following ranges.

Specifically, the carbon fiber composite material preferably has a first spin-spin relaxation time (T$2n$), measured in uncrosslinked form at 150° C. by the Hahn-echo method using the pulsed NMR technique with $^1$H as an observing nucleus, of 100 to 3000 microseconds. The fraction (fnn) of the components having the second spin-spin relaxation time (T$2nn$) is preferably less than 0.2.

The spin-lattice relaxation time (T1) measured by an inversion recovery method using the pulsed NMR technique is a measure indicating the molecular mobility of a substance together with the spin-spin relaxation time (T2). In more detail, the shorter the spin-lattice relaxation time of the elastomer, the lower the molecular mobility and the harder the elastomer. The longer the spin-lattice relaxation time of the elastomer, the higher the molecular mobility and the softer the elastomer.

The carbon fiber composite material according to this embodiment preferably has a flow temperature, determined by temperature dependence measurement of dynamic viscoelasticity, 20° C. or more higher than the flow temperature of the raw material elastomer. In the carbon fiber composite material according to this embodiment, the carbon nanofibers are uniformly dispersed in the elastomer. In other words, the elastomer is restrained by the carbon nanofibers, as described above. In this state, the elastomer exhibits molecular motion smaller than that of the elastomer which does not include the carbon nanofibers, whereby flowability is decreased. The carbon fiber composite material according to this embodiment having such flow temperature characteristics shows a small temperature dependence of dynamic viscoelasticity to exhibit excellent thermal resistance.

The carbon fiber composite material according to this embodiment may be directly used as an elastomer material in the form of natural rubber, synthetic rubber, or a thermoplastic elastomer, or may be used as a raw material for a metal or resin composite material (i.e., a masterbatch as a carbon nanofiber source). The carbon nanofibers are generally entangled and dispersed in a medium to only a small extent. However, when the carbon fiber composite material according to this embodiment is used as a raw material for a metal or resin composite material, since the carbon nanofibers exist in the elastomer in a dispersed state, the carbon nanofibers can be easily dispersed in a medium by mixing the raw material with a medium such as a metal or a resin.

Examples according to the invention and comparative examples are described below. Note that the invention is not limited to the following examples.

(1) Preparation of Samples of Examples 1 to 5

Step (a)

A 6-inch open roll (roll temperature: 20° C., roll distance: 0.5 mm) was provided with a predetermined amount of an elastomer (100 parts by weight (phr)) shown in Table 1. The elastomer was wound around the roll and masticated for 30 minutes. The resulting liquid elastomer was then removed from the open roll.

Step (b)

The elastomer obtained in the step (a) was again wound around the open roll (roll temperature: 20° C., roll distance: 1.0 mm). Carbon nanofibers (referred to as "MWNT" in Table 1) were supplied to the elastomer in a predetermined amount (parts by weight (phr)) shown in Table 1. After mixing the elastomer and the carbon nanofibers, the resulting mixture was removed.

Step (c)

The mixture obtained in the step (b) was placed in a heating furnace heated at 100° C., and heated for 10 hours to increase the molecular weight of the elastomer in the mixture, thereby obtaining a rubbery elastic mixture.

Step (d)

The rubbery elastic mixture obtained in the step (c) was supplied to the open roll (roll temperature: 10 to 20° C., roll distance: 0.3 mm) and tight-milled five times. The surface velocity ratio of the two rolls was set at 1.1. The carbon fiber composite material obtained by tight milling was supplied to the roll of which the roll distance was set at 1.1 mm, and then sheeted. The resulting sheet was compression-molded at 90° C. for 5 minutes to obtain uncrosslinked carbon fiber composite material samples of Examples 1 to 5 having a thickness of 1 mm.

1 part by weight (phr) (i.e., ½ or less of the optimum amount of crosslinking agent) of a peroxide was mixed into the carbon fiber composite material obtained by tight milling. The mixture was supplied to the open roll of which the roll distance was set at 1.1 mm, and then sheeted. The resulting sheet containing the crosslinking agent was compression-molded at 175° C. for 20 minutes to obtain crosslinked carbon fiber composite material samples of Examples 1 to 5 having a thickness of 1 mm.

(2) Preparation of samples of Comparative Examples 1 to 4

A 6-inch open roll (roll temperature: 10 to 20° C., roll distance: 1.5 mm) was provided with a predetermined amount of an elastomer (100 parts by weight (phr)) shown in Table 2. The elastomer was wound around the roll, masticated for 5 minutes, and provided with carbon nanofibers. The mixture was removed from the open roll. The roll distance was then reduced from 1.5 mm to 0.3 mm. The mixture was again supplied to the open roll and tight-milled five times. The surface velocity ratio of the rolls was set at 1.1. The carbon fiber composite material obtained by tight milling was supplied to the roll of which the roll distance was set at 1.1 mm, and then sheeted. The resulting sheet was compression-molded at 90° C. for 5 minutes to obtain uncrosslinked carbon fiber composite material samples of Comparative Examples 1 to 4 having a thickness of 1 mm.

1 part by weight (phr) (i.e., ½ or less of the optimum amount of crosslinking agent) of a peroxide was mixed into the carbon fiber composite material obtained by tight milling. The mixture was supplied to the open roll of which the roll distance was set at 1.1 mm, and then sheeted. The resulting sheet containing the crosslinking agent was compression-molded at 175° C. for 20 minutes to obtain crosslinked carbon fiber composite material samples of Comparative Examples 1 to 4 having a thickness of 1 mm.

In Tables 1 and 2, "NR" denotes natural rubber, "EPDM" denotes ethylene-propylene rubber, and "MWNT" denotes a multi-walled carbon nanotube with an average diameter of about 13 nm (manufactured by IJIN Nanotech Co., Ltd.). Note that the samples of Examples 1 to 5 and Comparative Examples 1 to 4 were not crosslinked using a crosslinking agent.

(3) Measurement using Pulsed NMR Technique

The samples obtained in Examples 1 to 5 and Comparative Examples 1 to 4 were subjected to measurement by the Hahn-echo method using the pulsed NMR technique. In Examples 1 to 5, the raw material elastomer, the elastomer wound around the roll before mastication in the step (a), the elastomer after mastication, the mixture obtained in the step (b), the mixture obtained in the step (c), and the uncrosslinked carbon fiber composite material sample obtained in the step (d) were measured. In Comparative Examples 1 to 4, the raw material elastomer, the elastomer wound around the roll, the mixture after supplying the carbon nanofibers, and the uncrosslinked carbon fiber composite material sample after tight milling were measured.

The measurement was conducted using a "JMN-MU25" manufactured by JEOL, Ltd. The measurement was conducted under conditions of an observing nucleus of $^1$H, a resonance frequency of 25 MHz, and a 90-degree pulse width of 2 microseconds. A decay curve was determined while changing Pi in the pulse sequence (90°x-Pi-180°x) of the Hahn-echo method. The sample was measured in a state in which the sample was inserted into a sample tube within an appropriate magnetic field range. The measurement temperature was 30° C. and 150° C. The measurement temperature is shown in the parenthesis in Tables 1 and 2. The first spin-spin relaxation time ($T2n$) and the fraction (fnn) of components having the second spin-spin relaxation time ($T2nn$) of each sample were determined by this measurement. The measurement results are shown in Tables 1 and 2.

(4) Measurement of M10 (10% Modulus)

The crosslinked carbon fiber composite material samples (width: 5 mm, length: 50 mm, thickness: 1 mm) of Examples 1 to 5 and Comparative Examples 1 to 4 were stretched at 10 mm/min, and the stress (M10: 10% modulus (MPa)) at a deformation of 10% was determined.

(5) Measurement of Tensile Strength (TB)

Specimens prepared by cutting the crosslinked carbon fiber composite material samples of Examples 1 to 5 and Comparative Examples 1 to 4 in the shape of a 1A dumbbell were subjected to a tensile test in accordance with JIS K6251 at a temperature of 23±2° C. and a tensile rate of 500 mm/min using a tensile tester (manufactured by Toyo Seiki Seisakusho, Ltd.) to measure the tensile strength (TB (MPa)).

(6) Measurement of Dynamic Storage Modulus (E')

Specimens prepared by cutting the crosslinked carbon fiber composite material samples of Examples 1 to 5 and Comparative Examples 1 to 4 in the shape of a strip (40×1×5 (width) mm) were subjected to a dynamic viscoelasticity test in accordance with JIS K6394 using a dynamic viscoelasticity tester DMS6100 (manufactured by SII) at a chuck distance of 20 mm, a temperature of 30° C., a dynamic strain of ±0.05%, and a frequency of 10 Hz to measure the dynamic modulus of elasticity (E'(MPa)) at 30° C.

(7) Measurement of Elongation at Break (EB)

Specimens prepared by cutting the crosslinked carbon fiber composite material samples of Examples 1 to 5 and Comparative Examples 1 to 4 in the shape of a 1A dumbbell in accordance with JIS K6251 were subjected to a tensile fracture test at a temperature of 23±2° C. and a tensile rate of 500 ml/min using a tensile tester (manufactured by Toyo Seiki Seisaku-sho, Ltd.) to measure the elongation at break (EB (%)). The results are shown in Tables 1 and 2.

(8) Perfect Linear Range

Figure 4:
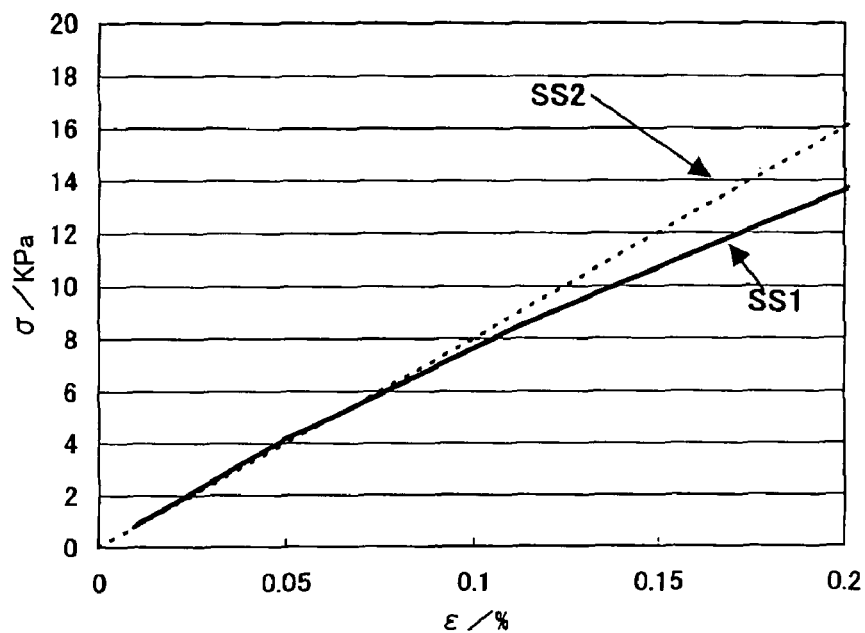
FIG. 4 is a graph showing a stress-strain curve according to Example 2.
Figure 5:
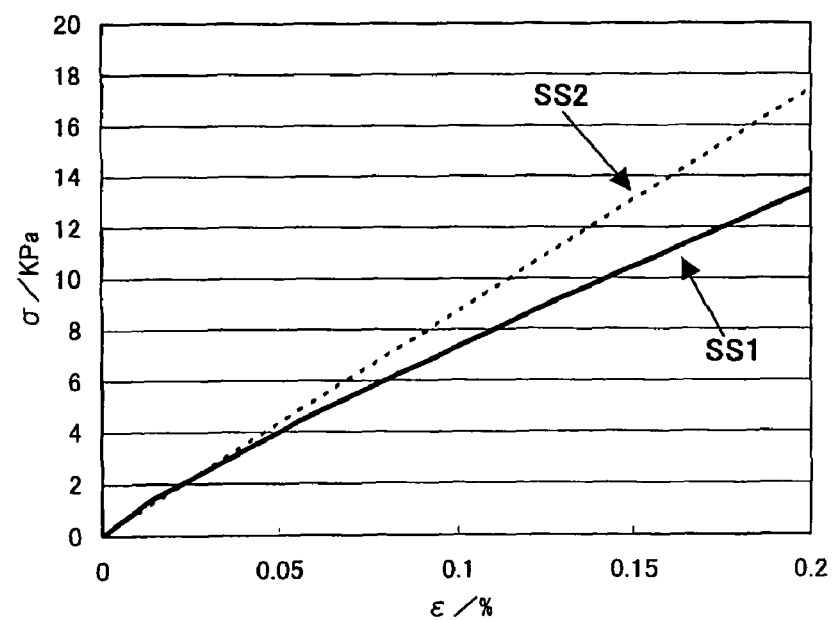
FIG. 5 is a graph showing a stress-strain curve according to Comparative Example 1.

The stress-strain curve (hereinafter referred to as "SS1") obtained by measuring the crosslinked carbon fiber composite material samples of Examples 1 to 5 and Comparative Examples 1 to 4 and the stress-strain curve (hereinafter referred to as "SS2") determined from the dynamic modulus of elasticity (E') obtained by the dynamic viscoelasticity test were compared. The range up to the stress upper limit in which the value of the stress-strain curve SS1 is almost the same as the value of the stress-strain curve SS2 (i.e., the stress-strain curves SS2 and SS1 coincide) was determined as a perfect linear range. FIGS. 4 and 5 are graphs illustrative of the perfect linear range using Example 2 and Comparative Example 1. A dotted straight line shown in FIG. 4 represents the stress-strain curve SS2 of Example 2 determined from the dynamic modulus of elasticity (E'), and a solid curved line represents the stress-strain curve SS1 of Example 2. As shown in FIG. 4, the stress-strain curve SS1 initially almost coincides with the stress-strain curve SS2, and starts to deviate from the stress-strain curve SS2 at a strain of 0.06%. Therefore, the perfect linear range of Example 2 is 0.06. A dotted straight line shown in FIG. 5 represents the stress-strain curve SS2 of Comparative Example 1 determined from the dynamic modulus of elasticity (E'), and a solid curved line represents the stress-strain curve SS1 of Comparative Example 1. As shown in FIG. 5, the stress-strain curve SS1 initially almost coincides with the stress-strain curve SS2, and starts to deviate from the stress-strain curve SS2 at a strain of 0.01%. Therefore, the perfect linear range of Comparative Example 1 is 0.01. A carbon fiber composite material sample having a larger perfect linear range exhibits higher composite material quality and a larger initial stress (rigidity).

TABLE 1

| | | | Example 1 | Example 2 | Example 3 | Example 4 | Example 5 |
|---|---|---|---|---|---|---|---|
| Component | Elastomer | NR | 100 | 100 | 100 | 100 | 0 |
| | | EPDM | 0 | 0 | 0 | 0 | 100 |
| | MWNT | | 5 | 10 | 20 | 40 | 40 |
| Results of measurement using pulsed NMR technique $T_{2n}$ (30° C.)/microsecond | Step (a) | Raw material elastomer | 700 | 700 | 700 | 700 | 520 |
| | | Wound elastomer | 1900 | 1900 | 1900 | 1900 | 1800 |
| | | Elastomer after mastication | 6000 | 6000 | 6000 | 6000 | 5000 |
| | Step (b) | Mixture including MWNT | 6200 | 6500 | 6200 | 5800 | 4700 |
| | Step (c) | Mixture after increasing molecular weight | 2300 | 2350 | 2400 | 2500 | 2200 |
| | Step (d) | Uncrosslinked carbon fiber composite material | 1350 | 1280 | 1060 | 890 | 450 |
| Results of measurement using pulsed NMR technique (150° C.) | $T_{2n}$ (150° C.)/ microsecond | Uncrosslinked carbon fiber composite material | 2880 | 2150 | 1760 | 1040 | 560 |
| | fnn (150° C.) | Uncrosslinked carbon fiber composite material | 0.17 | 0.107 | 0.13 | 0.078 | 0 |
| Evaluation of properties of crosslinked carbon fiber composite material | M10 | (MPa) | 0.5 | 1.06 | 1.22 | 1.63 | 4.4 |
| | TB | (MPa) | 2.7 | 6.1 | 7.8 | 11.3 | 15.2 |
| | EB | (%) | 210 | 220 | 220 | 210 | 200 |
| | E' (30° C.) | (MPa) | 4.2 | 10.7 | 25 | 94.3 | 110 |
| | Perfect linear range | | 0.06 | 0.06 | 0.07 | 0.06 | 0.07 |

TABLE 2

| | | | Comparative Example 1 | Comparative Example 2 | Comparative Example 3 | Comparative Example 4 |
|---|---|---|---|---|---|---|
| Component | Elastomer | NR | 100 | 100 | 100 | 0 |
| | | EPDM | 0 | 0 | 0 | 100 |
| | MWNT | | 10 | 20 | 40 | 40 |
| Results of measurement using pulsed NMR technique $T_{2n}$ (30° C.)/microsecond | Raw material elastomer | | 700 | 700 | 700 | 520 |
| | Wound elastomer | | 1900 | 1900 | 1900 | 1800 |
| | Mixture after supplying MWNT | | 2200 | 2150 | 2300 | 2060 |
| | Uncrosslinked carbon fiber composite material | | 1110 | 1160 | 1070 | 580 |
| Results of measurement using pulsed NMR technique (150° C.) | $T_{2n}$ (150° C.)/ microsecond | Uncrosslinked carbon fiber composite material | 1670 | 1880 | 1860 | 700 |
| | fnn (150° C.) | Uncrosslinked carbon fiber composite material | 0.147 | 0.108 | 0.06 | 0 |
| Evaluation of properties of crosslinked carbon fiber composite material | M10 | (MPa) | 0.34 | 0.51 | 0.85 | 2.7 |
| | TB | (MPa) | 9 | 10.5 | 14.3 | 14.4 |
| | EB | (%) | 265 | 210 | 120 | 110 |
| | E' (30° C.) | (MPa) | 8.74 | 24.6 | 93.1 | 82.0 |
| | Perfect linear range | | 0.01 | 0.007 | 0.005 | 0.002 |

As is clear from Tables 1 and 2, the following items were confirmed from Examples 1 to 5 according to the invention. That is, the crosslinked carbon fiber composite material samples of Examples 1 to 5 according to the invention had a perfect linear range larger than those of the carbon fiber composite material samples of Comparative Examples 1 to 4. This indicates that the quality of the composite material is increased by uniformly dispersing the carbon nanofibers in the elastomer.

The crosslinked carbon fiber composite material samples of Examples 1 to 5 according to the invention had a higher M10 value compared to the crosslinked carbon fiber composite material samples of Comparative Examples 1 to 4. For example, the amount of carbon nanofibers in Example 1 was 5 parts by weight, whereas the amount of carbon nanofibers in Comparative Example 1 which had a similar M10 value was 20 parts by weight. In the case where the desired M10 value is 1.0 MPa, 10 parts by weight of the carbon nanofibers are sufficient in Example 2, whereas even 40 parts by weight of the carbon nanofibers are insufficient in Comparative Example 3 to obtain the desired properties. Specifically, the crosslinked carbon fiber composite material samples of Examples 1 to 5 according to the invention can achieve the same initial stress (rigidity) as that of the crosslinked carbon fiber composite material samples of Comparative Examples 1 to 4 while reducing the amount of carbon nanofibers by ¼ to ⅙. This improves economic efficiency.

In Comparative Example 3, the elongation at break (EB) significantly decreased when the amount of carbon nanofibers was increased to 40 parts by weight. However, the elongation at break (EB) decreased to only a small extent in the carbon fiber composite material sample of Example 4 even when the amount of carbon nanofibers was increased to 40 parts by weight.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A method of producing a carbon fiber composite material comprising:
    (a) masticating an elastomer, the elastomer in uncrosslinked form having a first spin-spin relaxation time ($T2n$), measured at 30° C. by a Hahn-echo method using a pulsed NMR technique with $^1H$ as an observing nucleus, of 100 to 3000 microseconds, to reduce the molecular weight of the elastomer to obtain a liquid elastomer;
    (b) mixing the elastomer obtained in the step (a) and carbon nanofibers having an average diameter of 0.5 to 500 nm to obtain a mixture;
    (c) increasing the molecular weight of the elastomer in the mixture obtained in the step (b) to obtain a rubbery elastic mixture; and
    (d) mixing the rubbery elastic mixture obtained in the step (c) to disperse the carbon nanofibers in the elastomer by a shear force to obtain a carbon fiber composite material.

2. The method of producing a carbon fiber composite material as defined in claim 1,
    wherein the liquid elastomer obtained in the step (a) in uncrosslinked form has a first spin-spin relaxation time ($T2n$), measured at 30° C. by the Hahn-echo method using the pulsed NMR technique with $^1H$ as an observing nucleus, of greater than 3000 microseconds; and
    wherein the rubbery elastic mixture obtained in the step (c) has a first spin-spin relaxation time ($T2n$), measured at 30° C. by the Hahn-echo method using the pulsed NMR technique with $^1H$ as an observing nucleus, of 3000 microseconds or less.

3. The method of producing a carbon fiber composite material as defined in claim 1, wherein the first spin-spin relaxation time ($T2n$) of the liquid elastomer obtained in the step (a) is 5 to 30 times the first spin-spin relaxation time ($T2n$) of the elastomer before mastication in the step (a).

4. The method of producing a carbon fiber composite material as defined in claim 1, wherein the first spin-spin relaxation time ($T2n$) of the rubbery elastic mixture obtained in the step (c) is 0.5 to 10 times the first spin-spin relaxation time ($T2n$) of the elastomer before mastication in the step (a).

5. The method of producing a carbon fiber composite material as defined in claim 1, wherein the first spin-spin relaxation time ($T2n$) of the carbon fiber composite material obtained in the step (d) is shorter than the first spin-spin relaxation time ($T2n$) of the rubbery elastic mixture obtained in the step (c).

6. The method of producing a carbon fiber composite material as defined in claim 1, wherein the carbon fiber composite material in uncrosslinked form has a first spin-spin relaxation time ($T2n$), measured at 150° C. by the Hahn-echo method using the pulsed NMR technique with $^1H$ as an observing nucleus, of 100 to 3000 microseconds, and a fraction (fnn) of components having a second spin-spin relaxation time ($T2nn$) of less than 0.2.

7. The method of producing a carbon fiber composite material as defined in claim 1, the method further comprising: (e) crosslinking the carbon fiber composite material obtained in the step (d).

8. The method of producing a carbon fiber composite material as defined in claim 1, wherein the molecular weight of the elastomer is increased in the step (c) by heating the mixture obtained in the step (b).

9. The method of producing a carbon fiber composite material as defined in claim 1, wherein the step (d) is performed by an open-roll method with a roll distance of 0.5 mm or less.

10. The method of producing a carbon fiber composite material as defined in claim 9, wherein a roll temperature is set at 0 to 50° C. in the step (d).

* * * * *